(12) United States Patent
Chiou et al.

(10) Patent No.: US 8,302,483 B2
(45) Date of Patent: Nov. 6, 2012

(54) ROBUST DESIGN OF HIGH PRESSURE SENSOR DEVICE

(75) Inventors: Jen-Huang Albert Chiou, Libertyville, IL (US); Shiuh-Hui Steven Chen, Lake Zurich, IL (US)

(73) Assignee: Continental Automotive Systems, Inc., Auburn Hills, IL (US)

( * ) Notice: Subject to any disclaimer, the term of this patent is extended or adjusted under 35 U.S.C. 154(b) by 63 days.

(21) Appl. No.: 13/035,139

(22) Filed: Feb. 25, 2011

(65) Prior Publication Data

US 2012/0216622 A1     Aug. 30, 2012

(51) Int. Cl.
*G01L 9/06*     (2006.01)
(52) U.S. Cl. ............................................. 73/721; 73/727
(58) Field of Classification Search ............. 73/700–756
See application file for complete search history.

(56) References Cited

U.S. PATENT DOCUMENTS

| | | | |
|---|---|---|---|
| 6,427,539 B1 | 8/2002 | Chen et al. | |
| 7,093,493 B2 | 8/2006 | Benzel et al. | |
| 7,412,892 B1 * | 8/2008 | Gross | 73/720 |
| 2005/0284228 A1 | 12/2005 | Toyoda | |
| 2010/0224004 A1 * | 9/2010 | Suminto et al. | 73/727 |
| 2010/0301431 A1 | 12/2010 | Ding et al. | |

OTHER PUBLICATIONS

International Search Report and Written Opinion dated Apr. 27, 2012, from corresponding International Patent Application No. PCT/US2012/023082.

* cited by examiner

*Primary Examiner* — Andre Allen

(57) ABSTRACT

In a pressure sensing element made of piezoresistors formed into a silicon substrate, thermally-induced stresses on the piezoresistors and thermally-induced voltage offsets can be reduced by thinning the substrate prior to forming the resistors and then forming the resistors into the thinned-out recess. Forming a circular or disk-shaped recess in the substrate and then forming the resistors therein is believed to cause thermally-induced stresses to be evenly distributed and/or cancelled out on all four piezoresistors of a Wheatstone bridge circuit.

20 Claims, 6 Drawing Sheets

ROBUST DESIGN OF HIGH PRESSURE SENSOR DEVICE

BACKGROUND

A high pressures sensor is usually composed of a pressure sensing element for pressure sensing, an application-specific integrated circuit (ASIC) for amplification and compensation, a port to resist high pressure and fluid corrosion and for the mounting of a pressure sensing element, and a connector for the voltage input and output. For the new device of interest, only the pressure sensing element, port, and their packaging are described herein for purposes of illustration. FIG. 1 shows a cross-sectional diagram of a prior art high pressure sensor device 100. The high pressure sensor device 100 is comprised of a port 102 in which a flat-bottomed hole 104 is formed. The port 102 is preferably made of metal.

The port 102 is designed to be threaded into a hole. Threads 105 are thus formed onto the outside surface 106 of the lower portion 108 of the port 102 and which enable the sensor 100 to be screwed into a mating threaded hole.

The hole 104 has an open end 110 through which fluid can flow into the hole 104. Fluid in the hole 104 is under pressure. The pressurized fluid thus exerts force on the relatively flat bottom end surface 112 of the hole 104.

The diaphragm 114 between the bottom end surface 112 and the top surface 116 of the port 102 is relatively thin and typically about from 0.5 to 1.5 mm in thickness depending on the pressure range and the size of the hole 104. When the diaphragm 114 deflects upwardly and downwardly responsive to the pressure applied to the bottom end surface 112, the top surface 116 of the diaphragm deflects responsive to pressure changes in the hole 104.

The deflections of the top surface 116 of the port 102 deform a piezoresistive pressure sensing element 118 attached to the top surface 116 of the port 102 near the edge of the diaphragm 114. The pressure sensing element 118 made of a thin single crystalline silicon (Si) is embedded into a glass frit 124. The glass frit 124 is attached to and sits atop the top surface 116 of the port 102 near the diaphragm edge as shown in FIG. 1. The glass frit 124 has a thickness of about fifty microns, i.e., $50 \times 10^{-6}$ meters. On the top surface 126 of the pressure sensing element 118, four piezoresistors are formed and connected to each other to form a Wheatstone bridge for pressure sensing as shown in FIG. 2.

Merriam-Webster's Collegiate Dictionary 11$^{th}$ Edition defines a Wheatstone bridge as an electrical bridge consisting of two branches of a parallel circuit joined by a galvanometer and used for determining the value of an unknown resistance in one of the branches. As used herein, the term Wheatstone bridge refers to the circuit topology shown in FIG. 2, namely the parallel connection of two series-connected resistors.

FIG. 2 is a top view of the piezoresistive pressure sensing element 118 with a dimension of 800 um×800 um×15 um. The pressure sensing element 118 is processed using conventional techniques to form four resistors 202-1 through 202-4 in the top surface 126 of the pressure sensing element 118. The resistors 202-1 through 202-4 are formed of a p-material, embodiments of which are well-known to those of ordinary skill in the semiconductor art. Electrical interconnects 204 made of p+ material connected to the bottom of bond pads 206 are also formed on the top surface 126 of the pressure sensing element 118. Each interconnect 204 provides an electrical connection between two resistors in order to connect the resistors to each other to form a resistive Wheatstone bridge circuit.

Four interconnects 204 are shown on the top surface 126. Each interconnect 204 extends outwardly from a point or node 205 between two of the four resistors 202 next to each other, and connects to the bottom of a metal bond pad 206. Each bond pad 206 is considered to be located "in" or proximate to, a corresponding corner 208 of the top surface 126 of the pressure sensing element 118. Each interconnect 204 thus terminates at and connects to a bond pad 206.

FIG. 2 also shows an orientation fiducial 210 on the top surface 126. The fiducial 210 is a visually perceptible symbol or icon the function of which is simply to enable the orientation of the pressure sensing element 118.

Each bond pad 206 has a different label or name that indicates its purpose. The bond pad 206 located in the lower-right corner and the bond pad 206 in the upper-left corner receive an input or supply voltage for the Wheatstone bridge circuit. Those two bond pads are denominated as $V_p$ and $V_n$, respectively. The other two bond pads are output signal nodes denominated as $S_p$ and $S_n$, respectively.

A well-known problem with prior art pressure sensors that attach a pressure sensing element 118 to a diaphragm 114 using a glass frit 124 is that one or more voids can be formed in the glass frit after the glass firing process. FIG. 3A is cross-sectional view of a prior art glass frit 124 having a void 302 in the glass frit 124 and immediately below a pressure sensing element 118. FIG. 3B is a top view of the structure shown in cross-section in FIG. 3A. The location of the interfacial void 302 can be seen in FIG. 3B to be offset from the center of the pressure sensing element 118. The location of the void 302 between the pressure sensing element 118 and the glass frit 124 is considered herein to be asymmetric. It is however, located under only one of the resisters 202. Both the experimental measurement and computer simulations of the structure depicted in FIGS. 3A and 3B show that the void 302 creates offset voltage output and its variation over an operating temperature range due to asymmetrical thermal stresses on the resistors. The void 302 causes one of the resistors 202-1 through 202-4 to deform or change its value asymmetrically with respect to the other resistors leading to an offset voltage output variation in an operating temperature range in the sensor output. The offset voltage output variation over an operating temperature is called temperature coefficient of offset voltage output (TCO) and defined as follow TCO=(Vo at 140° C.–Vo at –40° C.)/180° C.

Where

Vo at 140° C.: offset voltage output at 140° C. without pressure applied

Vo at –40° C.: offset voltage output at –40° C. without pressure applied

Usually we want to keep the TCO between –50 uV/° C. and 50 uV/° C. so the ASIC can handle a thermal noise better.

The high offset voltage output variation over the temperature (or TCO) is difficult for an ASIC to compensate. An apparatus for reducing the TCO of the sensor having voids in the glass frit would be an improvement over the prior art.

DETAILED DESCRIPTION

Figure 4A:
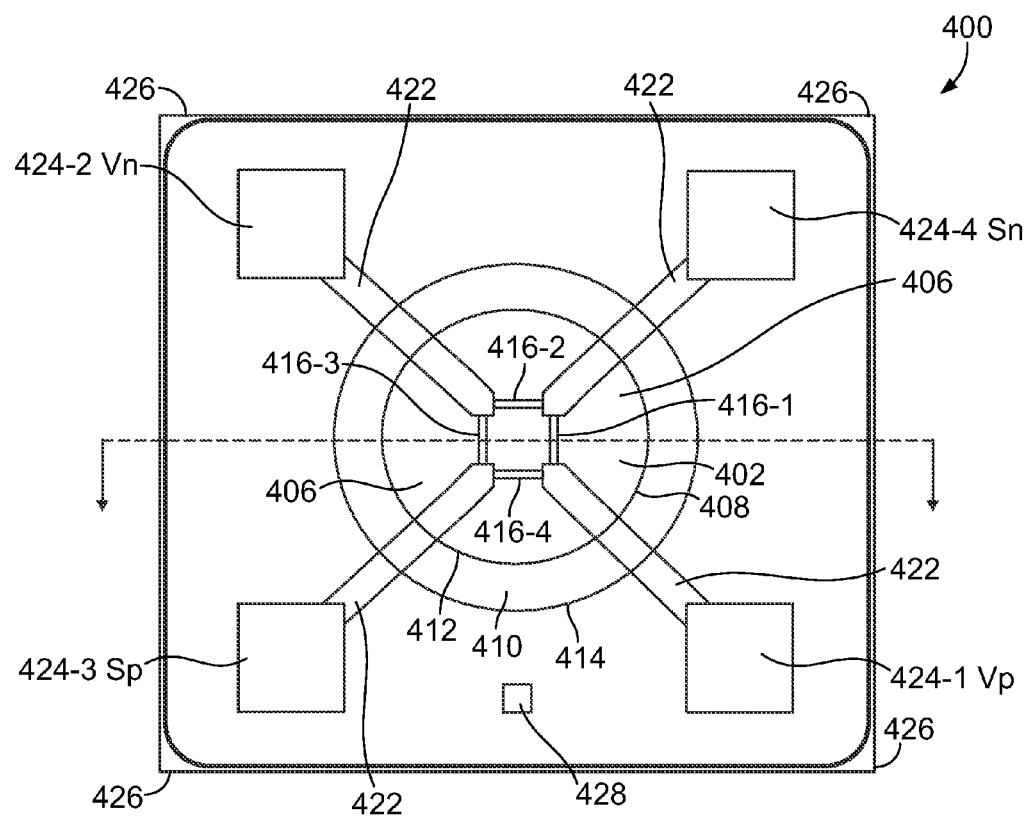
FIG. 4A is a top view of an improved high pressure sensor device having a recess formed in its top surface.
Figure 4B:
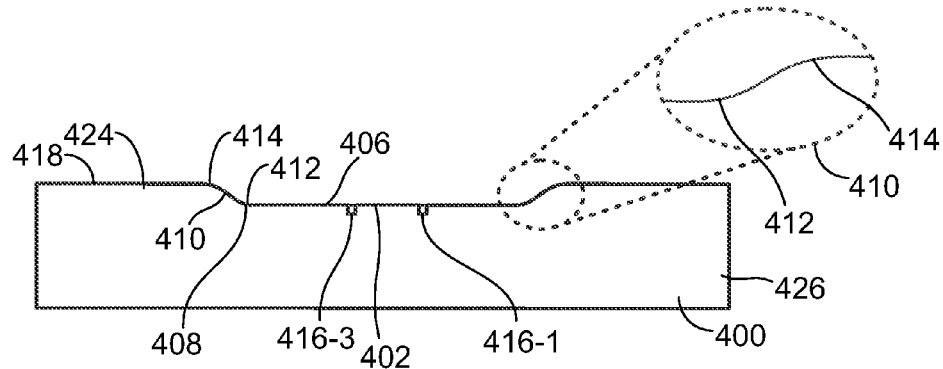
FIG. 4B is a cross-sectional view of the structure shown in FIG. 4A.

FIG. 4A is a top view of an improved pressure sensing element substrate 400 made of single crystalline silicone. FIG. 4B is a cross-sectional view of the structure shown in 4A.

The substrate 400 is formed to have a recess 402 in the top surface 418 of the substrate 400. The recess 402 has a cross-sectional shape reminiscent of a saucer or platter. A circular-shaped central region 406 is a planar or substantially planar surface and bounded at its perimeter 408 by a sloping surface or portion identified by reference numeral 410.

The sloping portion 410 has a smooth-shaped bottom end 412 defined by a radius. The top end 414 of the sloping portion 410 is also radiused. The radii at the bottom end 412 and the top end 414 of the sloping portion 410 are artifacts of the process used to form the recess 402.

The recess 402 can be formed by wet or dry etching. The sloping portion 410 makes P+ interconnect doping substantially easier as shown in FIG. 4A and FIG. 4B. Four resistors 416-1 through 416-4 made of P− material that form a Wheatstone bridge circuit are doped into the surface 406 of the recess 402. Two of the four resistors 416-1 and 416-3 are shown in the cross-sectional view in FIG. 4B.

Interconnects 422 made of P+ material are formed on the top surface 418 of the substrate 400. Each interconnect 422 provides an electrical connection between two of the resistors (416-1 through 416-4) formed into the top surface 418 of the substrate 400 including the surface of the sloping portion 410 and the surface 406 of the recess 402. The resistors are thus electrically connected as the aforementioned Wheatstone bridge topology.

Four interconnects 422 are shown on the top surface 418. Each interconnect 422 extends outwardly from where they meet the resistors to terminates at the bottom of a metal bond pad 424. Each bond pad 424 is considered to be located "in" or proximate to, a corresponding corner 426 of the top surface 418. The fiducial 428 on the top surface 418 is simply to enable the orientation of the improved pressure sensing element 400.

Computer modeling of the structure shown in FIGS. 4A and 4B demonstrated that the recess 402 reduces the sensors' offset voltage outputs and temperature coefficient of offset voltage output or "TCO". The thinning of the substrate 400 in the recess 402 is believed to "even out" or re-distribute thermally-induced stresses on piezoresistors 416-1 through 416-4 formed into the surface 406 of the recess 402. By more evenly distributing thermally-induced stresses, the values of the four resistors that make up the aforementioned Wheatstone bridge change symmetrically to minimize the TCO induced by interfacial voids.

Those of ordinary skill in the electrical arts know that a Wheatstone bridge circuit has two input nodes and two output nodes. The transfer function, which is the ratio of the output voltage to the input voltage can be expressed as shown in Eq. 1 below.

$$\frac{V_{out}}{V_{in}} = \left(\frac{R_3}{R_3 + R_4} - \frac{R_2}{R_1 + R_2}\right) \tag{1}$$

Rearranging the transfer function terms provides an equation for the output voltage $V_{out}$ as a function of the input voltage $V_{in}$ and values of the resistors in the Wheatstone bridge. Equation 2 below thus expresses the output voltage as a function of the input voltage and the values of the resistors that comprise the Wheatstone bridge circuit.

$$V_{out} = \left(\frac{R_3}{R_3 + R_4} - \frac{R_2}{R_1 + R_2}\right) V_{in} \tag{2}$$

It can be seen from Eq. 2 that the output voltage will of course change as the resistors' values change induced by pressure, temperature change, thermal mismatch, etc. Computer modeling and measurement data of prior art sensors shows that a void in a glass frit that is used to mount the die having the resistors will induce uneven thermal stresses on the resistors. The output voltage will therefore change as a result.

Equation 3 below expresses the output voltage as a function of the fluctuations in resistance values.

$$V_{out} = \sum_{i=1}^{4} \left(\frac{\partial V_{out}}{\partial R_i}\right) \Delta R_i \tag{3}$$

Expanding Equation 3 into Equation 4 below shows that $V_{out}$ will vary with changes in each of the resistors R1 through R4.

$$V_{out} = \frac{V_{in}}{4} \left(\frac{\Delta R_1}{R_1} - \frac{\Delta R_2}{R_2} + \frac{\Delta R_3}{R_3} - \frac{\Delta R_4}{R_4}\right) \tag{4}$$

For a piezoresistive device, the ratio of the resistance change versus the resistance for each resistor can be expressed as follow $$\frac{\Delta R_i}{R_i} = \frac{\pi_{44}}{2}(\sigma_i^L - \sigma_i^T)$$

where
$\sigma_i^L$: longitudinal stress on the resistor i
$\sigma_i^T$: transverse stress on the resistor i
and the value of piezoresistive coefficient, $\pi_{44}$ is approximately 1.381/GPa with a boron doping density of 1.8E15/cm^3.

Equation 4 shows that the value for the ratio of the resistance change versus the resistance for each resistor is dependent on the longitudinal and transverse stresses on each resistor. If the longitudinal stresses on Resistor 1 and 3 are aligned to perpendicular to the edge of the diaphragm, then the transverse stresses on Resistor 2 and 4 will be also perpendicular to the edge of the diaphragm. The stress perpendicular to the edge of the diaphragm is denominated as Syy. In this condition, the transverse stresses on Resistor 1 and 3 and the longitudinal stresses on Resistor 2 and 4 will be parallel to the edge of the diaphragm. The stress parallel to the edge of the diaphragm is denominated as Sxx. Therefore, Equation 4 can be re-written as Equation 5 below.

$$V_{out} = \frac{\pi_{44} V_{in}}{2} \times \frac{1}{4} \sum_{i=1}^{4} (Syy - Sxx)_i \quad (5)$$

$V_{out}$ is thus a function of the sum of the differential stresses, (Syy–Sxx) on all the four resistors. According to Equation 5, when the pressure sensor device is under the pressure, the stress perpendicular to the diaphragm on each resistor, Syy will be higher than the stress parallel to the diaphragm on each resistor, Sxx. Therefore the pressure sensor device has a high sensitivity. In order to minimize the noise, however, it is desirable to keep the voltage output, or the offset voltage output in this condition as low as possible, and preferably zero for the noise induced by the thermal stress. Based on Equation 5, it is apparent that if thermally-induced stresses Syy and Sxx can be equalized or if the sum of (Syy–Sxx) can be reduced to zero, the offset voltage output will become zero due to the cancellation of the stresses.

Figure 6:
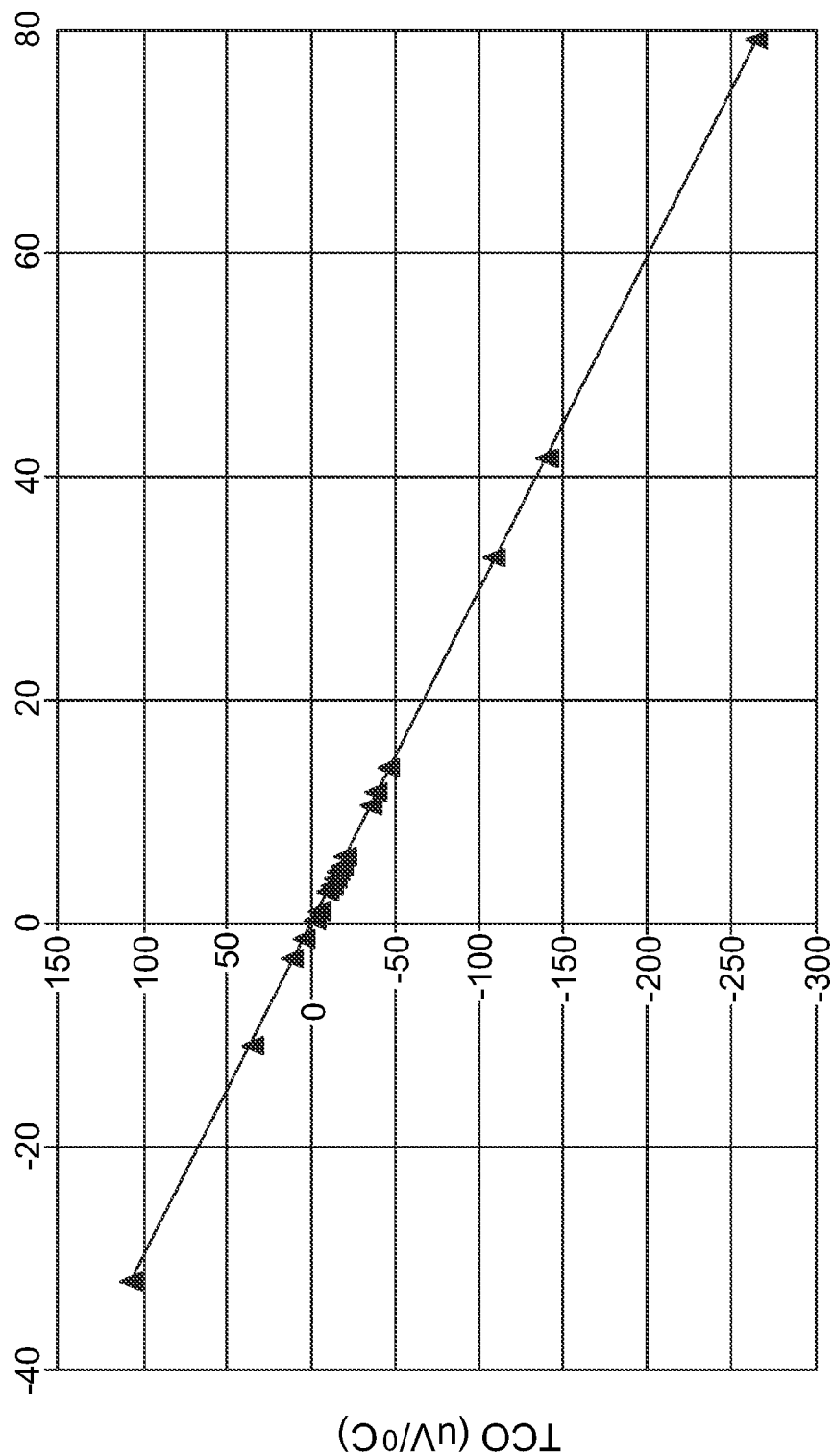
FIG. 6 shows the relationship between the TCO and the room-temperature offset voltage output.

FIG. 6 shows the relationship between the TCO and the room-temperature offset voltage output. In FIG. 6, experimental data and computer simulations show that the TCO is proportional to the negative value of the room-temperature offset voltage output. In order to reduce or minimize the TCO, it is important to reduce or minimize the room-temperature offset voltage output.

Figure 1:
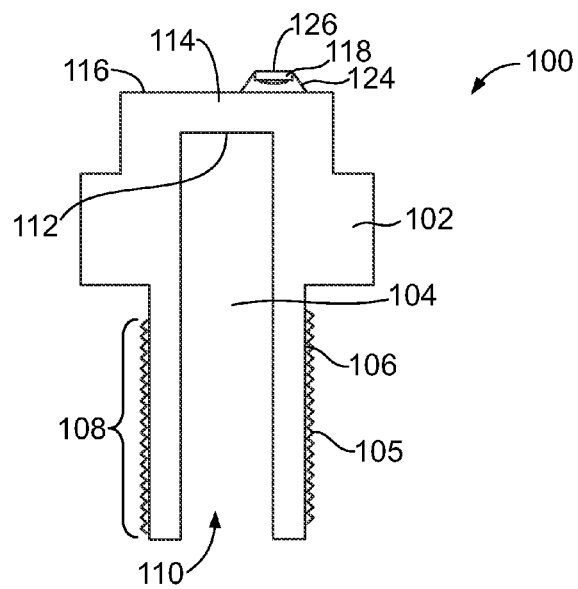
FIG. 1 is a cross-sectional view of a prior art high pressure sensor.
Figure 2:
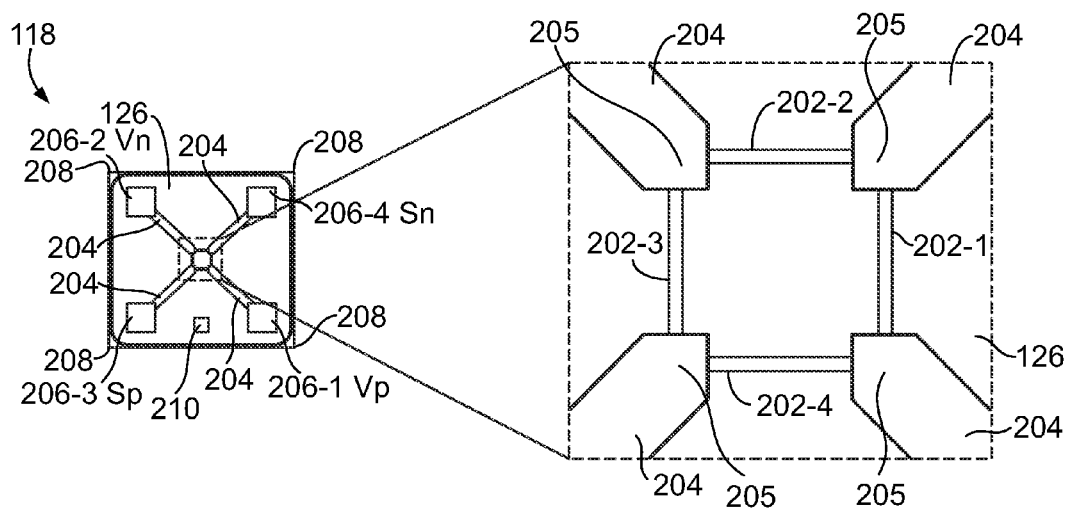
FIG. 2 is a top view of a piezoresistive pressure sensing element used in the sensor shown in FIG. 1.
Figure 3A:
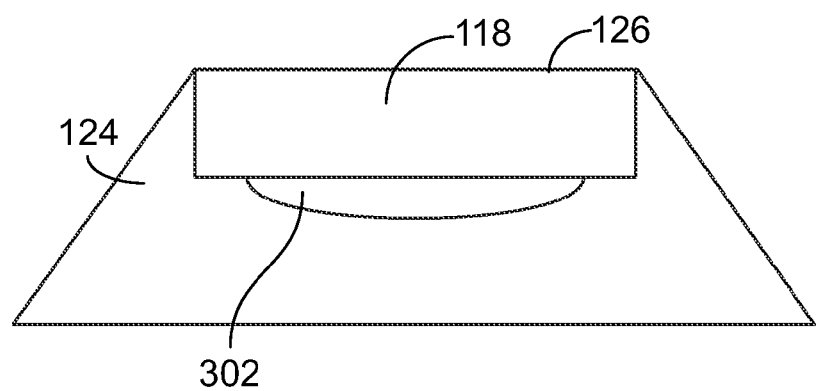
FIG. 3A is a cross-sectional view of a mounting glass frit having a void and supporting a piezoresistive pressure sensing element.
Figure 3B:
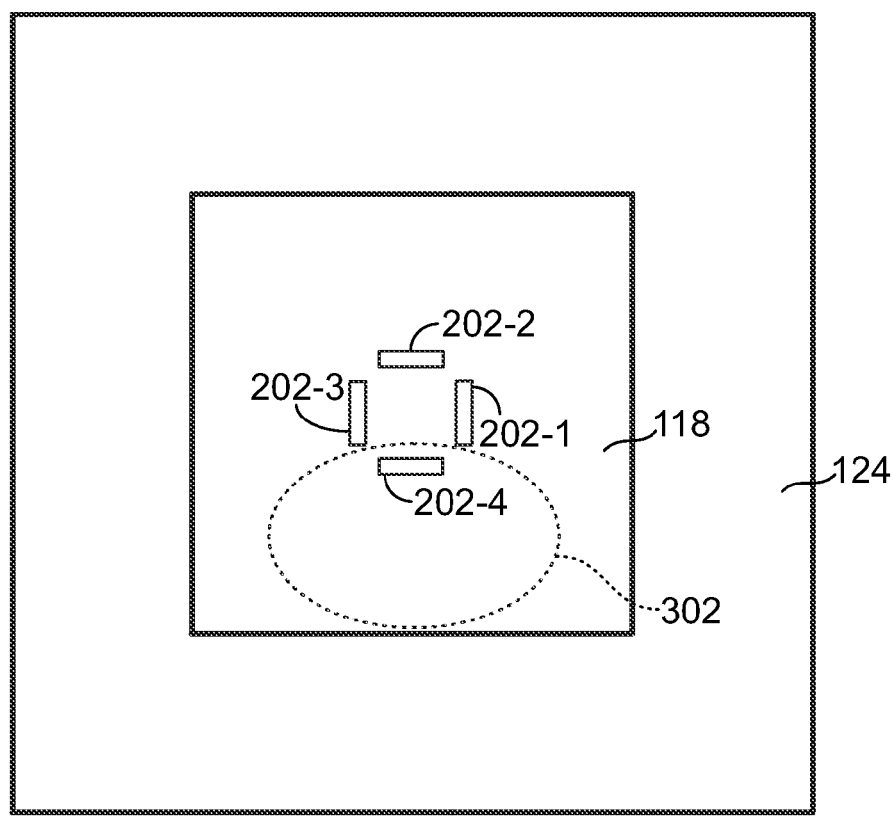
FIG. 3B is a top view of the structure shown in FIG. 3A.

The operating temperature range of the sensor 100 is between about −40° C. and about +140° C. Since the glass frit firing temperature is over 350° C., the process creates compressive stresses on all the four resistors 202 due to higher thermal expansions of metal port 102 and glass frit 124 versus a lower thermal expansion of the silicon pressure sensing element 118. Without an interfacial void, the prior art sensor 118 as shown in FIG. 2 has a symmetric resistor design which cancels out the difference between the thermally-induced stresses, Sxx and Syy on each resistor and also balance out the stress differences among four resistors.

Figure 7:
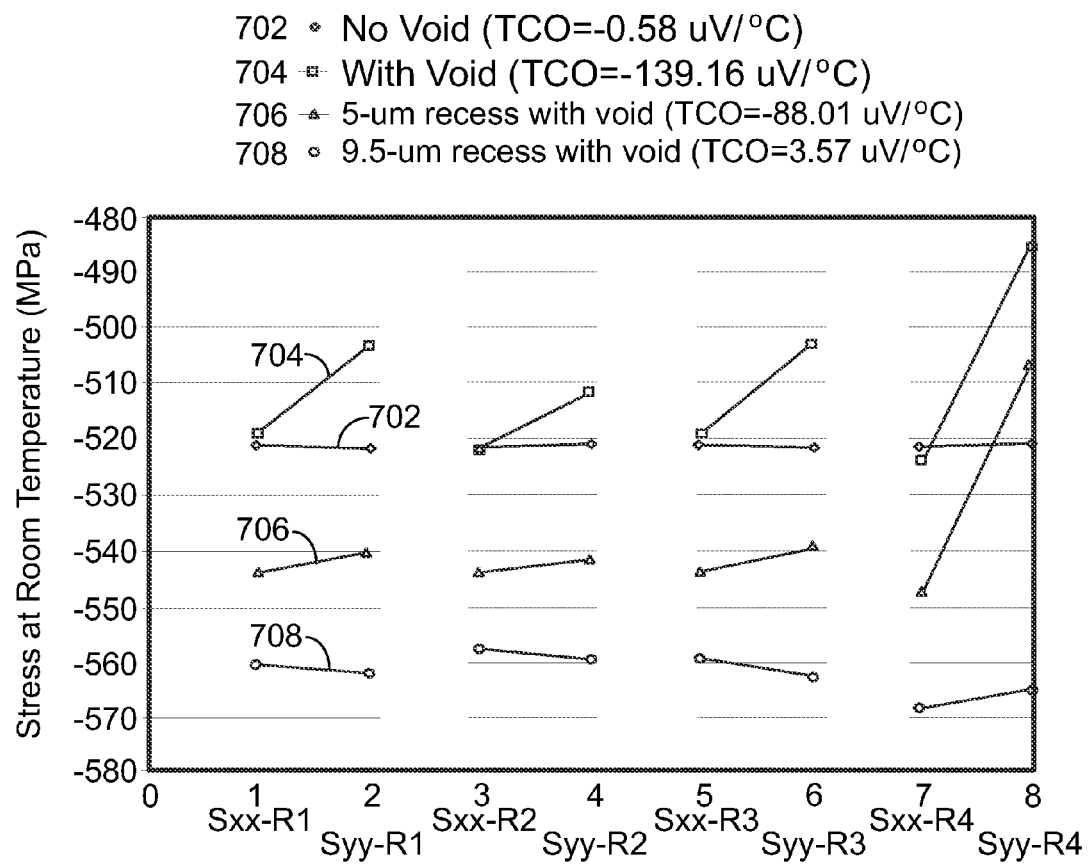
FIG. 7 shows stresses on each resistor at the room temperature for different embodiments to illustrate how the TCO is improved.

As depicted in FIG. 7, reference numeral 702 shows the stress components Sxx and Syy on each of the four resistors without an interfacial void in the glass frit. Resistors 1 and 3 which are named R1 and R3, respectively, both $(Syy-Sxx)_1$ and $(Syy-Sxx)_3$ are slightly negative while both $(Syy-Sxx)_2$ and $(Syy-Sxx)_4$ are slightly positive on R2 and R4. Thus the sum of all small (Syy–Sxx) on all four resistors approaches zero. Based on Equation 5, with the sum of all small (Syy–Sxx) on all four resistors cancelled out, the room-temperature offset voltage output approaches zero, so does the TCO.

Figure 5A:
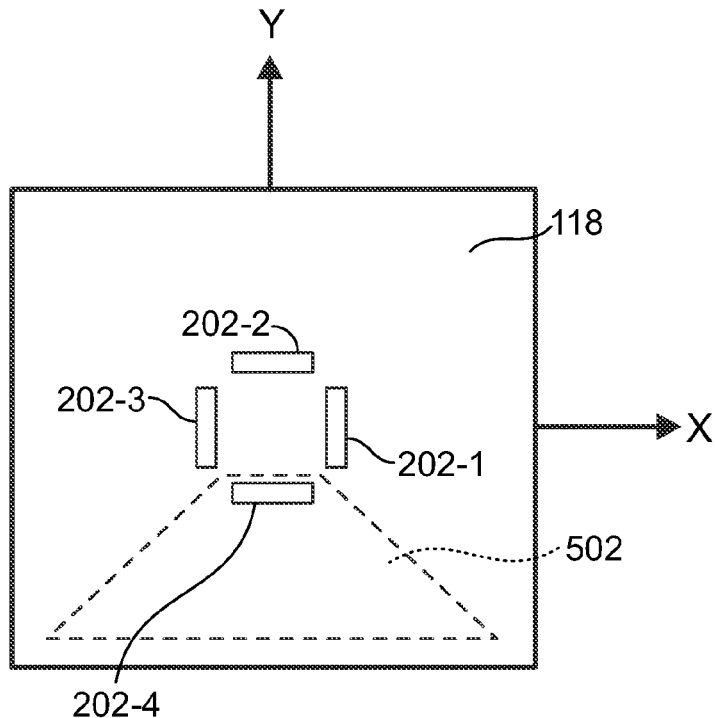
FIG. 5A depicts a prior art high pressure sensor device with a void in the glass frit.

Unfortunately, prior art sensors cannot cancel the thermal stresses induced by a void, which causes a high TCO. FIG. 5A depicts a prior art sensor 118 with a trapezoid void 502 between the pressure sensing element 118 and the glass frit 124 beneath resistor R4 202-4. Reference numeral 704 in FIG. 7 shows the stresses on all four resistors 202-1 through 202-4 of the prior art pressure sensing element 118 with a thickness of 15 um. Since the void can relieve the thermal-mismatched stress and the trapezoid void is in the negative Y-direction, all the Syy stress magnitudes are reduced or less compressed. Due to the location of the trapezoid void beneath resistor R4 202-4, the Syy on R4 is relieved most, then the Syy on R1 202-1 and R3 202-3, and the Syy on R2 202-2 the least.

Thereby all of the differential stresses (Syy–Sxx) become high positive. Especially (Syy–Sxx) on R4 is substantially higher than those on other resistors because the void is right beneath R4. Thus, the void causes a high room-temperature offset voltage output based on Equation 5 and a very high negative TCO at −139.16 uV/° C.

Figure 5B:
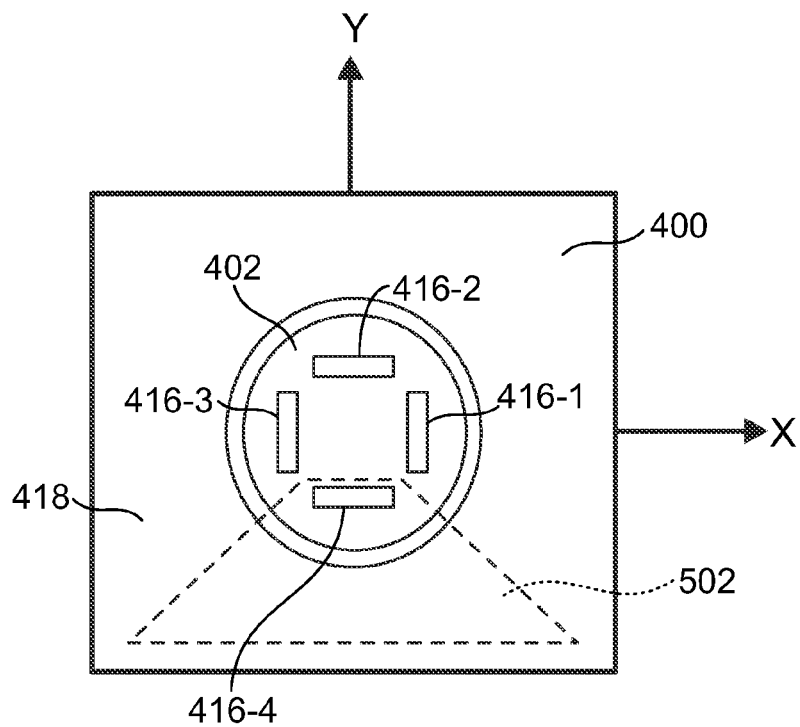
FIG. 5B depicts an improved high pressure sensor device having a recess with a void in the glass frit.

FIG. 5B depicts the same interfacial void 502 beneath an improved high pressure sensor device 400 detailed in FIGS. 4A and 4B. The sensor device has a circular or disk-shaped recess 402 centered on the top surface 418 of the 15-um thick pressure sensing element 400. Reference numeral 706 in FIG. 7 shows the stresses on all the four resistors 416-1 through 416-4 of the improved pressure sensing element 400 with a 5-um deep recess which re-distributes the Sxx and Syy stresses on each resistor. Because of the recess, the center of the pressure sensing element becomes thinner and the surrounding thick wall pushes inward under the compression from the glass frit 124 which is compressed by the metal port 102, so the stress becomes more negative but the (Syy–Sxx) on each resistor is reduced. The room-temperature offset voltage output is therefore reduced, and so the TCO is reduced to about −88.01 uV/° C. However, the TCO is still out of a desired design range between about −50 uV/° C. and about +50 uV/° C. because (Syy–Sxx) on R4 is not reduced much due to the large void beneath R4.

The TCO can be improved further by additional deepening of the recess up to about 9.5 um for the pressure sensing element 400. The metal port 102 and glass frit 124 further compresses the resistors 416-1 through 416-4 on the pressure sensing element 400 with an even thinner center and a thicker surrounding wall. With a 9.5-um deep recess, the stresses are further re-distributed on all the four resistors 416-1 through 416-4. Numeral 708 in FIG. 7 shows that all (Syy–Sxx) on resistors R1 through R3 416-1 through 416-3 turn into small negative from positive, and the (Syy–Sxx) on resistor R4 416-4 drops significantly but still remains positive. The sum of all (Syy–Sxx) is virtually cancelled out and so the room-temperature offset voltage output is minimized to a small negative value. TCO is thus reduced to a small positive value at 3.57 uV/° C. The design can be further optimized by slightly reducing the recess depth and minimizing the TCO to almost zero without a thermal noise.

Simply by reducing the thickness of a pressure sensing element may not be able to resolve a TCO problem although it helps to further compress the resistors and reduce the differential stress, (Syy–Sxx) to a certain extent. The problem is it cannot reverse the sign of the differential stress on certain resistors for the stress cancellation. Therefore the room-temperature offset voltage output and TCO can still remain high beyond the allowable range. Also, the die thickness has its limitation and needs to maintain a certain level for the pick and placement during sensor assembly.

In a pressure sensor comprised of piezoresistors formed into a single crystalline silicon die, and which are connected together in a Wheatstone bridge topology, locating the piezoresistors in a thinned-out region that defines a recess significantly reduces thermally-induced signal variations caused by the presence of a void in a glass frit to which the die is mounted onto a diaphragm. The pressure sensor is able to sense pressures ranging from about one megapascal (MPa) up to about three hundred and fifty MPa.

The foregoing description is for purposes of illustration only. The true scope of the claims is set forth in the appurtenant claims.

What is claimed is:
1. A pressure sensor, comprising;
a diaphragm, responsive to pressure of a fluid;

a Wheatstone bridge comprised of piezoresistors formed into a silicon pressure sensing element having a symmetrically-shaped recess, the Wheatstone bridge being located proximate to the geometric center of the recess; and a glass frit, attaching the pressure sensing element to the diaphragm.

2. The pressure sensor of claim 1, wherein the silicon pressure sensing element has a first side facing the diaphragm and a second side facing away from the diaphragm, the symmetrically-shaped recess being formed into the second surface of the pressure sensing element.

3. The pressure sensing element of claim 2, wherein the symmetrically-shaped recess is configured to re-distribute thermally-induced stresses on the pressure sensing element.

4. The pressure sensing element of claim 2, wherein the symmetrically-shaped recess is substantially circular.

5. The pressure sensing element of claim 2, wherein the symmetrically-shaped recess is substantially square.

6. The pressure sensor of claim 1, wherein the diaphragm is metallic.

7. The pressure sensor of claim 1, wherein the symmetrically-shaped recess is substantially circular and formed into a first surface of the pressure sensing element with a slope surface.

8. The pressure sensor of claim 1, wherein the symmetrically-shaped recess is substantially square and formed into a first surface of the pressure sensing element with a slope surface.

9. The pressure sensor of claim 1, wherein the silicon pressure sensing element is a single crystal.

10. The pressure sensor of claim 1, wherein the silicon pressure sensing element is polycrystalline silicon.

11. The pressure sensor of claim 1, wherein the silicon pressure sensing element is amorphous silicon.

12. The pressure sensor of claim 1, wherein the silicon pressure sensing element has a thickness between about five microns and about thirty microns.

13. The pressure sensor of claim 1, wherein the glass frit has a thickness between about thirty microns and about one hundred microns.

14. The pressure sensor of claim 1, wherein the recess has a thickness between about one micron and about twenty microns.

15. The pressure sensor of claim 1, wherein the pressure sensor is configured to sense pressures ranging from about one megapascal (MPa) up to about three hundred and fifty MPa.

16. A sensor, comprising:
a single silicon-containing die (die) having a geometric center, a periphery, and pads positioned in proximity to said periphery;
a set of metal electrical contacts disposed on pads, metal electrical contacts including at least one input contact and at least one output contact;
an array of piezoresistors connected to each other to form a Wheatstone bridge circuit, the array of piezoresistors being formed into a die and configured to measure stresses on the die in response to pressure of a fluid; piezoresistors being symmetrically distributed around the geometric center of the die, the array of piezoresistors being in alignment and in proximity to, the geometric center of the die to distribute thermally induced stress on the piezoresistors;
a diaphragm to which the die is attached; and
a recess formed into the die, the recess having a geometric center that is substantially coincident with the geometric center of the die, the Wheatstone bridge circuit being located near the geometric center of the recess, the recess being configured to re-distribute thermally-induced stress on the piezoresistors such that longitudinal and transverse thermally-induced stresses on the piezoresistors are substantially equal.

17. The sensor of claim 16, further comprising an electronic circuit, operatively coupled to the set of metal electrical contacts disposed on pads.

18. The sensor of claim 16, wherein the diaphragm is metallic.

19. The sensor of claim 16, further comprising a glass frit, which attaches the die to the diaphragm.

20. The sensor of claim 18, further comprised of an oxide layer on a first surface of the diaphragm, the glass frit being located between the oxide layer and the die.

* * * * *